Patented Dec. 20, 1949

2,491,919

UNITED STATES PATENT OFFICE 2,491,919

PROCESS FOR THE RECOVERY OF NITROGEN OXIDES AND HYDROCARBONS FROM GASEOUS MIXTURES

Richard S. Egly, Terre Haute, Ind., assignor to Commercial Solvents Corporation, Terre Haute, Ind., a corporation of Maryland No Drawing. Application June 10, 1944, Serial No. 539,791

3 Claims. (Cl. 23—161)

This invention relates to the separation of gas mixtures and more particularly to a process for separating and recovering hydrocarbon and nitrogen oxide components of gas mixtures resulting from the vapor phase nitration of alkanes having from 3 to 8 carbon atoms inclusive.

When saturated hydrocarbons, especially the paraffin hydrocarbons of low molecular weight, such as propane, butane, pentane, hexane, etc., are nitrated in the vapor phase, according to known processes, the hydrocarbon is mixed with nitric acid or nitrogen dioxide and the resulting mixture is passed through a heated reaction chamber. The reactions which ensue result in the formation of nitroparaffins as the main and desired product. However, the vapors after reaction contain in addition to the nitroparaffins, unreacted paraffin hydrocarbons, nitrogen oxides, carbon oxides and unsaturates such as olefins. To effect economical operation of the process, it is desirable not only to recover the organic nitro products but also to recover the unreacted hydrocarbons and the nitrogen oxides for reuse.

The recovery of these products, however, presents unexpected difficulties. When attempts were made to remove the unreacted saturated hydrocarbons from the mixture by compression and liquefaction before recovering the nitrogen oxides, serious explosions occurred, due, it was afterwards found, to the reaction of the nitrogen oxides, particularly nitrogen dioxide, with some of the unsaturated materials also present in the gases and to the building up of these unstable compounds in the hydrocarbon recovery system. The alternative expedient of recovering the nitrogen oxides before recovering the saturated hydrocarbons resulted in other difficulties. When the nitrogen oxides were oxidized to nitrogen dioxide prior to their recovery, in the presence of a hydrocarbon, the oxygen introduced for this purpose formed an inflammable mixture with the hydrocarbon. Schemes were worked out, however, by which either of these two types of recoveries could be effected. In the process in which the hydrocarbon is recovered first, the explosive hazards are eliminated by first removing the unsaturated materials from the gas mixture by treatment with concentrated sulfuric acid before recovery of either the hydrocarbon or nitric oxide constituent. This procedure, described in co-pending application Serial No. 378,959, now Patent No. 2,346,441, allows the hydrocarbons to be recovered by compression and liquefaction and then the nitrogen oxides to be recovered by oxidation and absorption in water in accordance with prior practice. A procedure in which the nitrogen oxides are recovered before the hydrocarbons was worked out in accordance with U. S. Patent 2,309,845 in which the explosion hazards and inflammability characteristics are suppressed by first adding to the gases additional hydrocarbons so that upon addition of air to oxidize the nitric oxide to nitrogen dioxide a mixture results having an excess of hydrocarbon, such that the percentage of this constituent is above the limit necessary to produce an inflammable mixture of air and hydrocarbon.

This procedure has numerous disadvantages in that greater quantities of gases must be handled, due to the added hydrocarbon, which also reduces the efficiency of oxidation of the nitric oxide (NO) to nitrogen dioxide. Moreover, severe corrosive conditions result throughout the entire recovery system subsequent to this step, due to the early conversion of the non-corrosive nitric oxide (NO) to the very corrosive nitrogen dioxide ($NO_2$), enough traces of which remain in the gases after absorption to cause corrosion of equipment. Furthermore, tar, formed by the reaction of the nitrogen dioxide with hydrocarbon, accumulates in later stages of the recovery system. Even the explosion hazard is not entirely eliminated, as unstable, potentially explosive material collects in the recovered acid columns and has to be removed periodically to prevent explosions.

The process described in No. 2,346,441 in which unsaturates are first removed, does, indeed eliminate the explosive hazard and permits hydrocarbo recovery by compression and liquefaction, and subsequent recovery of nitrogen oxides as nitric acid. But this process is somewhat disadvantageous in the necessity for utilizing concentrated (93–95%) sulfuric acid which is difficult and unpleasant to handle and which results in severe corrosion of the equipment.

It is an object of the present invention to avoid all the difficulties of the prior art by a process of recovering waste gases from the vapor phase nitration of lower alkanes having from 3 to 8 carbon atoms inclusive in which the hydrocarbon components are recovered first, followed by the recovery of the nitrogen oxide components.

Another object is to provide a process for recovering alkanes and nitrogen oxides from the waste gases resulting from the vapor phase nitration of lower alkanes having from 3 to 8 carbon atoms inclusive in which the formation of inflammable gas mixtures is avoided.

A further object of the invention is to effect recovery of these waste gases by a process in which explosion hazards are avoided.

Another object of the invention is to provide a process of the character described in which the formation of unstable reaction products is avoided.

A still further object is to provide a process in which corrosion difficulties are reduced.

Further objects will appear from the specification and claims.

These and other objects are accomplished in accordance with my invention in which the waste nitration gases resulting from the vapor phase nitration of alkanes having from 3 to 8 carbon atoms inclusive, after recovery of nitroalkane components are first treated with an absorbent for the unreacted hydrocarbons, which does not absorb any substantial quantities of nitrogen oxides and only limited quantities of unsaturates, and the unabsorbed portion containing the nitrogen oxides is further treated to recover the oxides of nitrogen.

The gases resulting from the vapor phase nitration of lower alkanes as described from which the nitroalkanes have been removed by known processes, and containing the unreacted alkanes, nitrogen oxides, the latter almost entirely in the form of nitric oxide (NO), and unsaturates such as ethylene and propylene, together with some carbon oxides, nitrogen, etc., are treated in accordance with my invention directly for removal of the unreacted hydrocarbons without prior removal of either unsaturates (as in U. S. Serial No. 378,959) or of nitrogen oxides (as in 2,309,845). This is accomplished by subjecting the gases to a scrubbing and absorption operation with an alkane absorbent such as kerosene hydrocarbon or other suitable oily absorbent. The unreacted alkanes having 3 or more carbon atoms are substantially completely soluble in the kerosene and are absorbed thereby except for very small quantities of the order of a few percent by volume. The solubilities of the alkanes in the absorbent vary somewhat, the higher members being more soluble at ordinary temperatures and pressures than the lower members. While methane and ethane can be absorbed substantially completely by utilizing larger quantities of absorbent, and by carrying out the absorption at lowered temperatures, such expedients would result also in the absorption by the kerosene of increased percentages of nitrogen oxides, to the point where the efficiency of the separation would be reduced, and the hydrocarbon-rich gas would be rendered hazardous from the point of view of inflammability and explosibility by the increased amounts of nitrogen oxides present. Accordingly, my process is not safely applicable to the recovery of the two lower members of the alkane series where these two members are the sole or chief constituents of the waste gases. The nitrogen oxides are virtually insoluble in the kerosene at ordinary room temperatures or at elevated temperatures and all but small traces of the order of a percent or so pass through the scrubbing operation unaffected. Carbon dioxide is relatively soluble in the kerosene, carbon monoxide substantially insoluble, and of the unsaturates, part are soluble, part relatively insoluble in the kerosene as explained more fully hereinafter.

The following flow sheet showing the progression of a typical waste gas resulting from the nitration of propane through the recovery system and its changes in compositions as it proceeds, will aid in visualizing the successive steps and separations effected by the several operations of my invention.

*Progression of typical gas through recovery system*

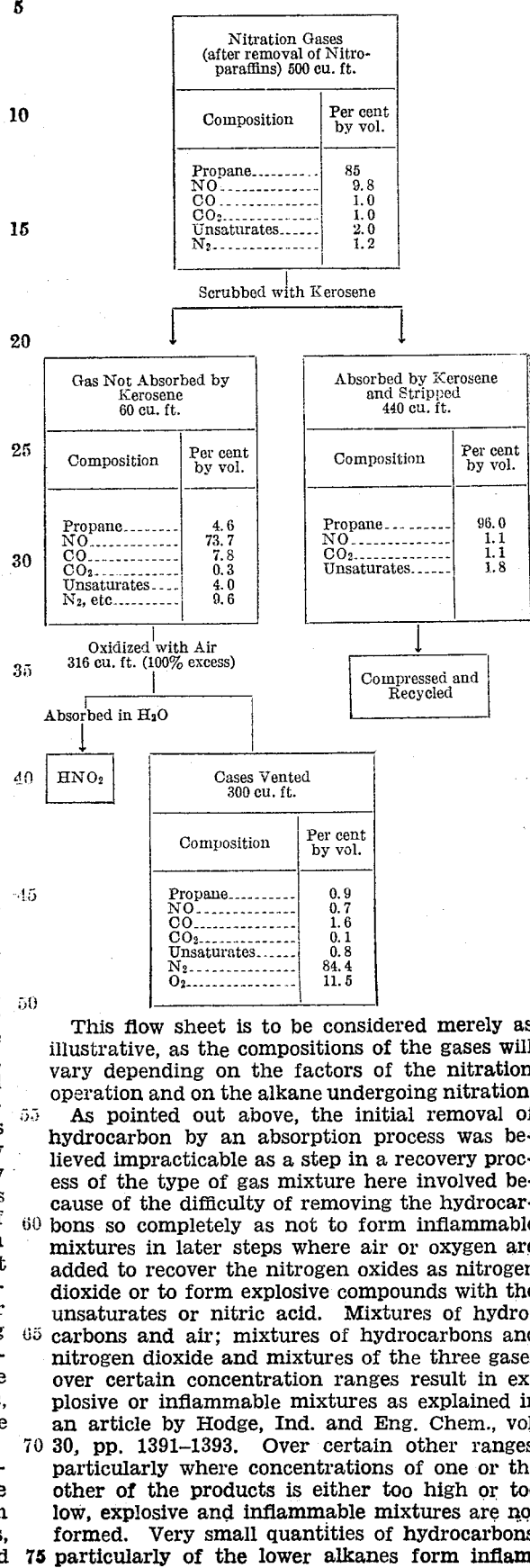

This flow sheet is to be considered merely as illustrative, as the compositions of the gases will vary depending on the factors of the nitration operation and on the alkane undergoing nitration.

As pointed out above, the initial removal of hydrocarbon by an absorption process was believed impracticable as a step in a recovery process of the type of gas mixture here involved because of the difficulty of removing the hydrocarbons so completely as not to form inflammable mixtures in later steps where air or oxygen are added to recover the nitrogen oxides as nitrogen dioxide or to form explosive compounds with the unsaturates or nitric acid. Mixtures of hydrocarbons and air; mixtures of hydrocarbons and nitrogen dioxide and mixtures of the three gases over certain concentration ranges result in explosive or inflammable mixtures as explained in an article by Hodge, Ind. and Eng. Chem., vol. 30, pp. 1391–1393. Over certain other ranges, particularly where concentrations of one or the other of the products is either too high or too low, explosive and inflammable mixtures are not formed. Very small quantities of hydrocarbons, particularly of the lower alkanes form inflammable or explosive mixtures with air and the same is true of nitrogen dioxide and hydrocarbons. In the case of propane and nitrogen dioxide, flammable mixtures are formed when a lower limit of about 6.4% by weight of propane is present. In the case of mixtures of air and propane, an amount of propane in the neighborhood of 2.4% by weight results in a flammable mixture.

By conducting the initial scrubbing absorption operation so as to bring the percentage of the residual hydrocarbon below the inflammable limits of mixtures thereof with either air or nitrogen dioxide which are introduced or formed in later recovery steps, and by carrying out the oxidation and recovery of the nitrogen oxides at this stage in the presence of very large excesses of air so that the hydrocarbon concentrations are below their inflammable limit in air, I can adopt the simple expedient of recovering unreacted hydrocarbons from the waste gases as the initial step after removal of nitroparaffins from the gases without the cumbersome expedient of increasing the volume of gases by the addition of hydrocarbons or inert gases to bring their concentration above the inflammable limits of the subsequent mixtures, and I can accomplish this without the necessity for first removing the unsaturated materials.

The unsaturates such as ethylene and propylene present in the gases to be recovered are rendered innocuous by my process so as not to require special treatment for their prior removal. By the initial step of my process, namely by the kerosene etc. scrubbing process, part of the unsaturates are dissolved in the kerosene, and part escape solution and come out of the scrubber as gases with the nitric oxide gas. This gas mixture is immediately passed to an absorption system in which the nitric oxide is oxidized to nitrogen dioxide and the nitrogen dioxide absorbed in water to form nitric acid. Since the unsaturates are not water soluble, they pass through the scrubber unchanged, and are vented to the atmosphere so that they do not have an opportunity to build up in the system, or form explosive compounds with the nitrogen oxides.

As to the unsaturates which are absorbed with the unreacted hydrocarbons, they too can do no harm, for since the bulk of the nitrogen oxides have been removed, even under subsequent compression to liquefy the hydrocarbon, insufficient unstable compounds are formed to cause explosive hazards. If traces are formed they are destroyed by recycling through the paraffin nitration system.

The waste gases, after substantially complete recovery of the nitroparaffins, are under an excess pressure of about 70–130 lbs. and contain between about 70–90% by volume of unreacted hydrocarbon, about 7–15% nitrogen oxides which are almost entirely nitric oxides (NO), about 2–5% unsaturates and the remainder inert gases including carbon oxides, nitrogen, etc. According to my process, I pass these gases through an absorber of known design, for example, through a packed bubble cap absorber in which kerosene or the like alkane absorbent is passed through the column counter-current to the flow of gas. The kerosene dissolves most of the lower alkanes and unsaturated hydrocarbons containing 3 or more carbon atoms. It also dissolves the bulk of the carbon dioxide and very small proportions of nitric oxide. The gases which pass through the scrubber undissolved contain substantially all of the nitrogen oxides, a small quantity of saturated hydrocarbons, part of the unsaturates, some carbon monoxide and the inerts including nitrogen.

The alkane absorbent is treated to remove the dissolved gases by any desired means, for example, by heating the solution or by "stripping" the hydrocarbons with steam or the like. The recovered gases contain largely the unreacted hydrocarbons with small quantities of nitric oxide, unsaturates and carbon dioxide. The nitric oxide at this stage will rarely be present to the extent of more than 1%, usually less, around a fraction of a percent. The unsaturates will rarely exceed 2.5% and will usually be present to the extent of 1 to 2% by volume of the recovered gases at this stage. These gases may be mixed with fresh hydrocarbon for reuse in the nitration process, or they may be first compressed to the reaction pressure of about 75–200 pounds/sq. in. for recycling, or may be further compressed to liquefaction for storage.

The gases which are not absorbed in the kerosene scrubber and which contain the nitric oxide and small amounts of unabsorbed alkanes, are treated with a substantial excess of air to oxidize the nitric oxide to nitrogen dioxide. If only the theoretical amount of air necessary to oxidize all the nitric oxide to nitrogen dioxide were used, the quantities present at this stage might be such as to result in a flammable mixture of alkane and air. This hazard is avoided by using an excess of air so as to bring the ratio of alkanes to air well below that at which flammable mixtures result. The effective excess of air can be greatly increased by first adding only a portion of the nitric oxide-alkane-containing gases to the air, and allowing sufficient time for part of the oxygen of the air to be consumed in oxidizing nitric oxide before adding the remaining gases. In my process, the excess of air used can be as high as desired and I find it desirable to use about 100% excess air, and as no further components are to be recovered from the gases, dilution to this extent does not involve later difficulties of handling the large volumes of gases resulting. As brought out above, the excess air should be large enough to bring the percentage of hydrocarbon and nitrogen oxides below the concentrations required to produce inflammable mixtures with air.

After the nitric oxide is oxidized to nitrogen dioxide, the nitrogen dioxide is dissolved in water to form nitric acid for reuse in the nitration process. The water absorption is preferably carried out in the preence of air or oxygen to insure substantially complete conversion of all the nitrogen oxides to nitric acid, those originally present and formed in the reaction of nitrogen dioxide with water. In practice the oxidation and dissolution in water are conveniently carried out more or less simultaneously in a tower type multiple plate scrubber. The air may be admitted at the bottom of the tower along with all the nitric oxide, or, part of the nitric oxide-containing gas may be added a few plates further up the column. Water is supplied to the scrubber at the top and trickles down the tower countercurrent to the flow of gas. Sufficient water is used to give the desired concentration of recovered acid. The reaction between nitric oxide and oxygen is a third order reaction which is very rapid as long as high concentrations of both reactants are present. Consequently most of the oxidation and dissolution of the nitrogen oxides will take place within a few plates of where the air and nitric oxide are admitted to the tower. This makes it possible to increase the effective excess of air as described, by admitting part of the nitric oxide-containing gases with the air, and the remainder a few plates higher up to maintain low effective ratios of alkane to oxygen in the gaseous mixture. After the absorption of the nitrogen dioxide, the remaining gases are vented to the atmosphere. These gases include all those present at the beginning of the oxidation and absorption step with the exception of the nitrogen oxides and include of course, the nitrogen and excess oxygen added as air in the oxidizing step. The vented gases are much diluted by the added air, a typical composition being given below.

|  | Per cent |
|---|---|
| Alkanes | 0.9 |
| NO | 0.7 |
| CO | 1.6 |
| $CO_2$ | 0.1 |
| Unsaturates | 0.8 |
| Nitrogen | 84.4 |
| Oxygen | 11.5 |

The following specific example will further illustrate my invention:

Example

Gases from the vapor phase nitration of propane from which the nitroparaffins had been removed were received at 75 pounds pressure and were of approximately the following composition:

|  | Per cent |
|---|---|
| Propane | 85.0 |
| Nitric oxide | 9.8 |
| Carbon monoxide | 1.0 |
| Carbon dioxide | 1.0 |
| Unsaturates | 2.0 |
| Others, mostly nitrogen | 1.2 |

These gases were passed at about 500 cu. ft. per hour through a packed absorber counter-current to 75-90 gallons per hour of kerosene. The kerosene dissolved most of the propane and other saturated and unsaturated hydrocarbons containing 3 or more carbon atoms. It also dissolved a large portion of the $CO_2$ and smaller amounts of NO. The undissolved gases emerging at approximately 60 cu. ft. per hour were of approximately the following composition:

|  | Per cent |
|---|---|
| Propane | 4.6 |
| NO | 73.7 |
| CO | 7.8 |
| $CO_2$ | .3 |
| Unsaturates | 4.0 |
| Unidentified | 9.6 |

The unidentified portion was not combustible in the presence of air, and tests in an explosion pipette with pure oxygen indicated approximately 90% inert material, presumably nitrogen.

The dissolved gases at about 440 cu. ft. per hour were driven off by heating the kerosene. An analysis of resulting gases showed approximately the following composition:

|  | Per cent |
|---|---|
| Propane | 96.0 |
| NO | 1.1 |
| $CO_2$ | 1.1 |
| Unsaturates | 1.8 |

The figure of 1.1% NO given in the example is undoubtedly higher than was actually present, and represents an analysis by an Orsat apparatus utilizing an absorbent $FeSO_4$ in $H_2SO_4$ which is known to give somewhat high readings when low percentages of NO are involved, due to slight solubility of propane and $CO_2$ in the reagent. It is known that a gas containing one percent of NO turns definitely reddish when released to the atmosphere. With the recovered propane of this example, no reddening was observed on exposure to air, so that the recovered propane undoubtedly contained less than 1% NO. This recovered propane was compressed to 80 lbs. pressure and returned to the nitration process.

The NO was recovered from the gases which were not absorbed in the kerosene scrubber by oxidizing the NO to $NO_2$ and dissolving the $NO_2$ in water in the presence of an excess of air. This was done in a 30 plate scrubber. The air, at 316 cubic feet per hour (100% excess) was admitted to the bottom of the tower which converted the nitric oxide to nitrogen dioxide. Water was supplied to the nitric acid recovery scrubber at the top at the rate of 6.3 pounds of water per hour, and yielded 14 lbs. per hour of nitric acid of a concentration of 55%. The unabsorbed gases, consisting of all constituents present at the beginning of the oxidation and absorption treatment with the exception of the oxides of nitrogen were vented to the atmosphere.

While the above described the preferred embodiments of my invention, it is to be understood that departures may be made therefrom within the scope of the specification and claims.

What is claimed is:

1. The process which comprises nitrating in the vapor phase lower alkanes having from 3 to 8 carbon atoms thereby producing a gaseous mixture containing nitroalkanes, unreacted alkanes, nitrogen oxides, carbon oxides and unsaturates, removing the nitroalkanes from said gaseous mixture leaving a residual mixture containing alkanes, nitrogen oxides, carbon oxides and unsaturates, contacting said residual mixture with a sufficient quantity of a selective liquid hydrocarbon absorbent for the alkanes to effect substantially complete absorption of said alkanes, thereby reducing the percentage of residual alkanes in the unabsorbed gases below those producing inflammable mixtures with air and with the nitrogen dioxide introduced and formed in the later steps of the process, then reacting the unabsorbed gases with an excess of air to oxidize the nitrogen oxides to nitrogen dioxide and recovering said nitrogen dioxide.

2. The process of claim 1 wherein said hydrocarbon absorbent is kerosene.

3. The process of claim 1 wherein the nitrogen dioxide is recovered by absorption in water to form nitric acid.

RICHARD S. EGLY.

REFERENCES CITED

The following references are of record in the file of this patent:

UNITED STATES PATENTS

| Number | Name | Date |
|---|---|---|
| 2,309,845 | Hodge | Feb. 2, 1943 |
| 2,346,441 | Lippincott | Apr. 11, 1944 |

Certificate of Correction

Patent No. 2,491,919                                                        December 20, 1949

RICHARD S. EGLY

It is hereby certified that errors appear in the printed specification of the above numbered patent requiring correction as follows:

Column 2, lines 34 and 35, for "hydrocarbo" read *hydrocarbon*; column 3, line 2, for "harzards" read *hazards*; line 69, for "pare" read *part*; column 4, line 40, in the flow sheet, for "$HNO_2$" read *$HNO_3$*; same line, for the words "Cases Vented" read *Gases Vented*; column 6, line 55, for "preence" read *presence*; column 8, line 32, for "described" read *describes*;

and that the said Letters Patent should be read with these corrections therein that the same may conform to the record of the case in the Patent Office.

Signed and sealed this 29th day of August, A. D. 1950.

[SEAL]

THOMAS F. MURPHY,
*Assistant Commissioner of Patents.*